(No Model.)
J. P. HYDE.
BASIN CLAMP.
No. 260,871. Patented July 11, 1882.
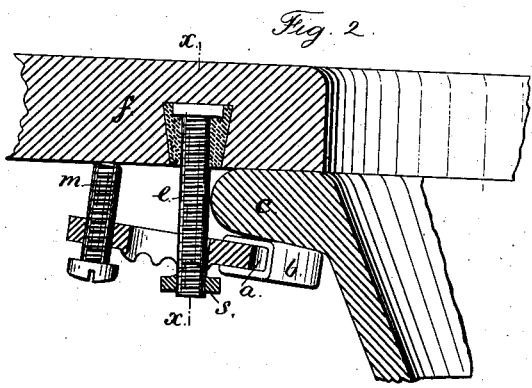
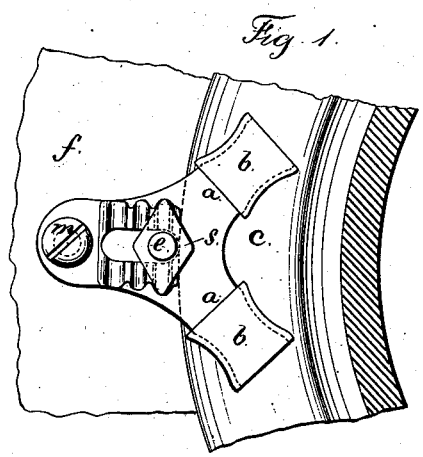
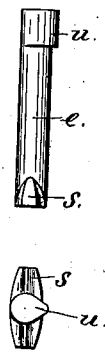
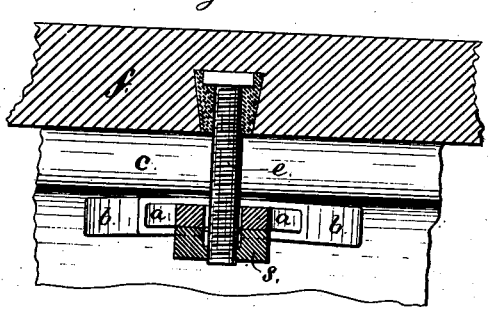
Witnesses
Chas. H. Smith
J. Hail
Inventor
James P. Hyde
per Lemuel W. Serrell
Atty.

UNITED STATES PATENT OFFICE.

JAMES P. HYDE, OF NEW YORK, N. Y.

BASIN-CLAMP.

SPECIFICATION forming part of Letters Patent No. 260,871, dated July 11, 1882.

Application filed February 2, 1882. (No model.)

*To all whom it may concern:*

Be it known that I, JAMES P. HYDE, of the city and State of New York, have invented an Improvement in Basin-Clamps, of which the following is a specification.

Clamps have been made for holding wash-basins to the under side of marble slabs and for attaching urinals and other basins. These clamps have usually been a slotted bar of metal with a projection at one end to set against the under side of the slab, the other end usually forked to rest up against the under side of the basin-flange, a screw leaded into the slab, and a nut to press the clamp upon the basin-flange. This is not adapted to the varying thicknesses of flanges, and there is no means for raising up the outer end of the clamp, and in screwing up the nut the clamp frequently slips off the flange of the basin.

My invention is made for avoiding the difficulties that have been practically experienced with the ordinary basin-clamps. I make use of a lever-clamp the body of which is slotted and provided with a corrugated surface, so that it will not slip beneath the cross-piece of the attaching screw or bolt, and the pressure is applied by a screw passing through the back end of the clamp and taking against the under side of the slab, and I apply yielding material—such as rubber—around the clamp where it rests upon the porcelain to increase the adhesion and lessen the risk of breaking the flange of the basin.

In the drawings, Figure 1 is an inverted plan, showing the basin-clamp in place upon the basin-flange. Fig. 2 is a section of the clamp, basin-flange, and slab; and Fig. 3 is a cross-section at *x x*. Fig. 4 is an elevation and plan view of a modification of the attaching-bolt.

The clamp is made with either a single or a forked end where it bears on the flange of the basin. I have shown the forked ends *a a*, and upon these I place yielding material—such as sections of india-rubber tubes *b b*—so that the bearing against the basin-flange *c* will be slightly yielding, and the clamp will not be liable to slip. The body of the clamp is slotted, as usual; but the surface at this place, instead of being smooth, is corrugated transversely, so that the V-shaped edges of the T-head upon the bolt *e* will not slip at this place. The bolt *e* is adapted to be fastened into the slab *f*, and its T-head *s* may be made in one piece with the body of the bolt; or it may be a nut, so that the body of the bolt can be leaded into the slab, and the nut turned to the proper distance from the slab to accommodate the thickness of the basin-flange. At the outer end of the lever-clamp there is a screw, *m*, or similar device—such as a wedge-block—that takes a bearing against the under side of the slab *f*. By revolving this screw the clamp will be forced against the flange with more or less power, and hold such flange firmly. The clamp will not be liable to slip, because the corrugations receiving the cross-piece of the attaching-bolt prevent the parts changing position as the pressure is applied.

I prefer to employ the bolt *e*, (shown in Fig. 4,) the same having the T-head *s* in one piece with the body of the bolt, and a cam-shaped projection, *u*, at one side. This does not require to be leaded into the marble. I bore a hole into the marble or stone about the same size as the shank of this bolt, and cut a groove in the stone at one side of the hole sufficient for the projections *u* to pass along in inserting the bolt, and after the bolt has been inserted it is firmly secured by giving it a partial rotation, which causes the projections *u* to cut into and hold the bolt firmly into the stone. This is of great advantage, as it prevents the necessity of taking down the slab and inverting it for leading the bolt in cases where repairs are required. The T-head *s* passes through the slot in the lever-clamp.

I claim as my invention—

1. The clamp for basin-flanges, having the transverse corrugations on the body adjacent to the slot for the bolt, substantially as set forth.

2. The clamp for basins, having yielding material—such as rubber—at the end or ends that bear upon the basin or its flange, as set forth.

3. The combination, with the slotted basin-clamp, of the attaching-bolt and the clamp-screw *m*, substantially as set forth.

4. The basin-clamp having a lever adapted to press at one end against the basin or flange, a set-screw at the other end, and an intermediate fulcrum secured in the slab, substantially as set forth.

5. In a basin-clamp, the combination of a slotted lever, having corrugations in the surface adjacent to the slot, with a fulcrum-bolt adapted to engage in the corrugations of the lever, substantially as set forth.

6. In combination with the slotted-lever basin-clamp, the T-headed bolt provided with a projection for securing it in the marble, substantially as set forth.

Signed by me this 28th day of January, A. D. 1882.

JAMES P. HYDE.

Witnesses:
GEO. T. PINCKNEY,
CHAS. H. SMITH.